United States Patent
Park

(10) Patent No.: US 9,331,601 B2
(45) Date of Patent: May 3, 2016

(54) INVERTER WITH POWER CELL OF DUAL STRUCTURE

(71) Applicant: LSIS CO., LTD., Anyang-si, Gyeonggi-do (KR)

(72) Inventor: Jong Je Park, Anyang-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/464,466

(22) Filed: Aug. 20, 2014

(65) Prior Publication Data

US 2015/0062992 A1    Mar. 5, 2015

(30) Foreign Application Priority Data

Aug. 29, 2013 (KR) .......................... 10-2013-0102913

(51) Int. Cl.
*H02M 5/45* (2006.01)
*H02M 7/5395* (2006.01)
*H02M 7/49* (2007.01)
(Continued)

(52) U.S. Cl.
CPC .............. *H02M 7/5395* (2013.01); *H02M 7/49* (2013.01); *H02M 7/487* (2013.01); *H02M 2001/0006* (2013.01)

(58) Field of Classification Search
CPC ............ H02M 7/5395; H02M 7/1555; H02M 7/1623; H02M 7/1626; H02M 7/7575
USPC .............. 363/34–37, 125, 128–129, 131–134
See application file for complete search history.

(56) References Cited

U.S. PATENT DOCUMENTS

| 3,775,662 A | 11/1973 | Compoly et al. |
| 5,552,976 A * | 9/1996 | Munro .................... B60L 9/005 363/132 |
| 5,864,475 A | 1/1999 | Ikawa et al. |

(Continued)

FOREIGN PATENT DOCUMENTS

| DE | 10-2005-025422 | 12/2006 |
| EP | 2575249 | 4/2013 |

(Continued)

OTHER PUBLICATIONS

European Patent Office Application Serial No. 14181784.1, Search Report dated Oct. 30, 2015, 7 pages.

(Continued)

*Primary Examiner* — Gary L Laxton
*Assistant Examiner* — Kevin H Sprenger
(74) *Attorney, Agent, or Firm* — Lee, Hong, Degerman, Kang & Waimey

(57) ABSTRACT

The present disclosure relates to an inverter with power cell of dual structure for use in high input voltage by changing a conventional 6-level cascaded H-bridge multilevel inverter to thereby reduce product development cost, manufacturing cost and volume of the product, the inverter including a first SMPS (Switching Mode Power Supply) connected to a first power cell region, a second SMPS connected to a second power cell region and a controller connecting the first and second SMPSs, where each phase is formed by serially connecting a plurality of power cells formed with a plurality of stages operated by receiving a power supplied from a phase shift transformer, and each of the plurality of power cells is mutually connected, and includes the first power cell region and the second power cell region independently operating.

4 Claims, 3 Drawing Sheets

(51) Int. Cl.
*H02M 7/487* (2007.01)
*H02M 1/00* (2006.01)

(56) References Cited

U.S. PATENT DOCUMENTS

| | | | |
|---|---|---|---|
| 5,986,909 A * | 11/1999 | Hammond et al. | 363/65 |
| 7,830,681 B2 * | 11/2010 | Abolhassani et al. | 363/37 |
| 8,008,923 B2 * | 8/2011 | Hammond | 324/426 |
| 8,923,025 B2 * | 12/2014 | Rastogi et al. | 363/79 |
| 2003/0043603 A1 * | 3/2003 | Schreiber | 363/37 |
| 2012/0212983 A1 * | 8/2012 | Schreiber | 363/37 |
| 2013/0076280 A1 | 3/2013 | Yoo | |
| 2014/0217947 A1 * | 8/2014 | Haugan | 318/503 |

FOREIGN PATENT DOCUMENTS

| | | |
|---|---|---|
| JP | 05-328731 | 12/1993 |
| JP | 11-041931 | 2/1999 |
| JP | 2012-228025 | 11/2012 |
| JP | 2013-074789 | 4/2013 |
| JP | 2013-074792 | 4/2013 |
| WO | 2013/080383 | 6/2013 |

OTHER PUBLICATIONS

Japan Patent Office Application Serial No. 2014-175190, Office Action dated Oct. 27, 2015, 5 pages.

* cited by examiner

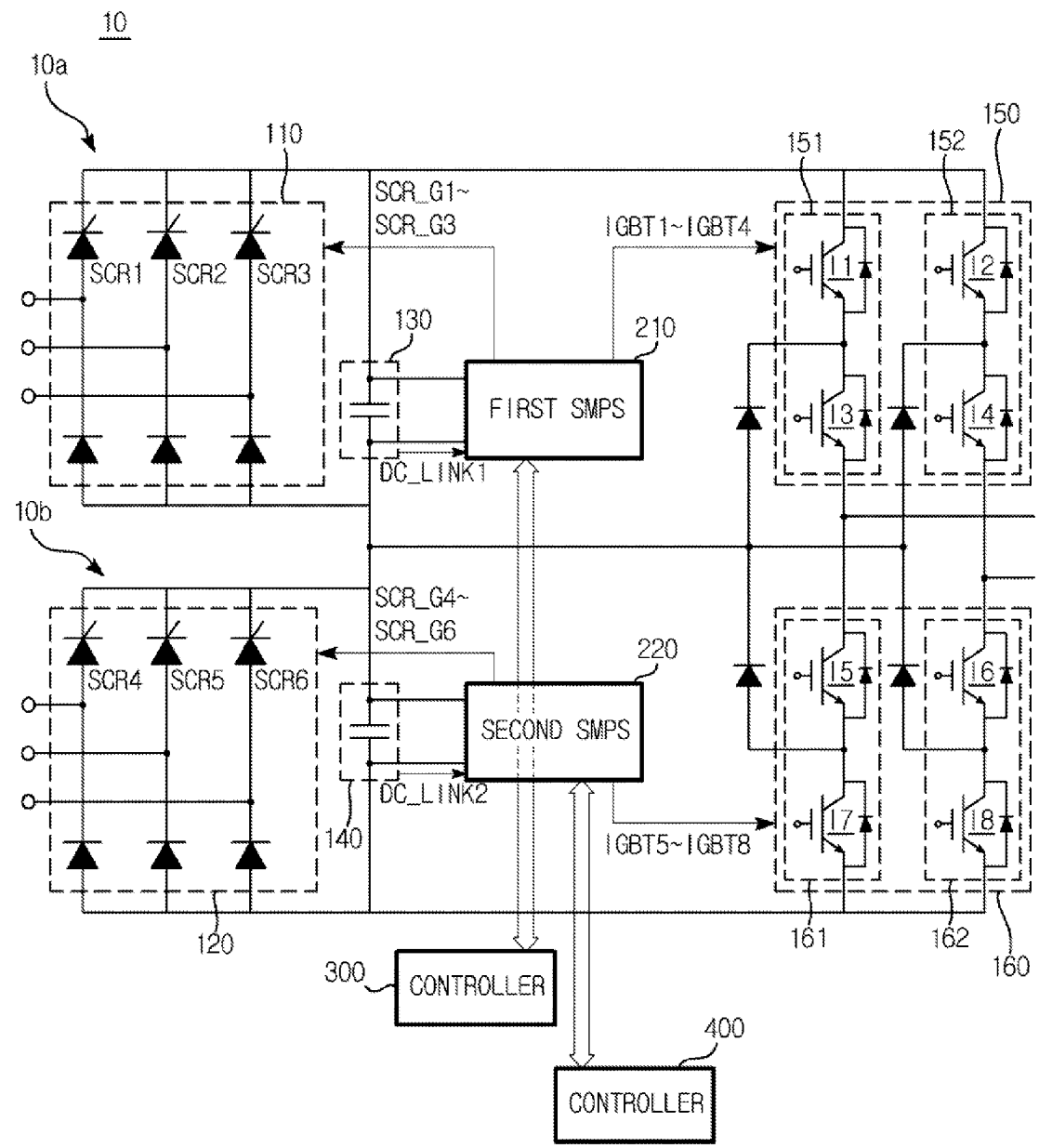

INVERTER WITH POWER CELL OF DUAL STRUCTURE

CROSS-REFERENCE TO RELATED APPLICATIONS

Pursuant to 35 U.S.C. §119(a), this application claims the benefit of earlier filing date and right of priority to Korean Patent Application No. 10-2013-0102913, filed on Aug. 29, 2013, the contents of which are all hereby incorporated by reference in its entirety.

BACKGROUND OF THE DISCLOSURE

1. Field of Endeavor

The teachings in accordance with exemplary embodiments of this disclosure generally relate to an inverter, and more particularly, to an inverter with power cell of dual structure configured to reduce product development cost, manufacturing cost and volume of the product by changing a conventional 6-level cascaded H-bridge multilevel inverter for use even in high input voltage.

2. Background

SMPS (Switching Mode Power Supply) is used as a current stabilization power for various electric/electronic/communication devices by controlling flow of power using a semiconductor switching process. Recently, concomitant with switching function improvement of semiconductors and technical development of integrated circuits, miniaturization of SMPS has been greatly implemented and research for reliability and efficiency improvement is actively progressed.

Each phase of a conventional 6-level cascaded H-bridge multilevel inverter includes a plurality of serially-connected unit cells, where each unit cell has an independent single phase inverter structure, and a high voltage can be obtained using low voltage unit cells, that is, low voltage power semiconductors by connecting a plurality of unit cells in series. An input side to which power of each unit cell is applied is connected to a phase shift transformer, and the phase shift transformer provides an independent power to each unit cell of the cascaded H-bridge multilevel inverter.

In order to rectify a 3-phase AC power, the unit cell having an independent single phase inverter structure includes a rectification unit including a diode and thyristors, a DC link unit configured to smooth the rectified voltage and an inverter unit configured to generate a PWM (Pulse Width Modulation) voltage by switching an IGBT using a PWM signal.

Meanwhile, in order to control the rectification unit and inverter unit in each unit cell, an inverter includes an SMPS and a controller configured to control the SMPS, and the SMPS applied for inverter basically uses a DC power outputted from a DC link unit as a power source, and generates an IGBT gate signal for driving a power switch elements of inverter unit by receiving a PWM signal from the controller, and generates a SCR (Silicon-Controller Rectifier) gate signal for driving the thyristor, whereby the thyristor and the power switch element are respectively driven by receiving the IGBT gate signal and the SCR gate signal. At this time, a conventional cascaded H-bridge multilevel inverter is of 6-level type and includes a total of 18 unit cells. Thus, an SMPS configured to control operation of each unit cell and a controller configured to control the SMPS must also include the same number as that of the unit cells.

Meanwhile, the currently-used unit cell receives, as an input, 635V shifted from a voltage of 6600V inputted into the system through a phase shift transformer, where a DC link voltage is 890V. Recently, demands increase on medium voltage inverter to various input voltages in the medium voltage inverter fields, which means that development of SMPS is required capable of using various DC voltages. The currently developed and used SMPS is a type that uses DC power of 890V to a 635V input based on unit cell, such that the unit cell receiving a 1270V input results in a problem of re-developing an SMPS capable of being used in this voltage level.

Particularly, as the input voltage increases, there arise lots of difficulties involving restrictions on insulation of circuits and ratings of core switching elements to disadvantageously generate increased development costs and decreased reliability of product. Thus, reviews and researches are required for medium voltage inverters capable of catering to market demands and securing reliability for the product.

SUMMARY OF THE DISCLOSURE

The present disclosure is provided to solve the aforementioned technical problems and therefore, the present disclosure relates to an inverter with power cell of dual structure for use in high input voltage by changing a conventional 6-level cascaded H-bridge multilevel inverter to thereby reduce product development cost, manufacturing cost and volume of the product.

In one general aspect of the present disclosure, there is provided an inverter with power cell of dual structure, the inverter comprising: a first SMPS (Switching Mode Power Supply) connected to a first power cell region, a second SMPS connected to a second power cell region and a controller connecting the first and second SMPSs, where each phase is formed by serially connecting a plurality of power cells formed with a plurality of stages operated by receiving a power supplied from a phase shift transformer, and each of the plurality of power cells is mutually connected, and includes the first power cell region and the second power cell region independently operating.

Preferably, but not necessarily, the first power cell region may include a first rectification unit configured to perform the rectification by receiving a power from the phase shift transformer and to include thyristors for preventing an inrush current, a first capacitor configured to generate a first DC_link voltage by smoothing a voltage rectified by being connected to the first rectification unit, and a first inverter unit configured to generate a PWM voltage by switching in response to control of the first SMPS.

Preferably, but not necessarily, the second power cell region may include a second rectification unit configured to perform the rectification by receiving a power from the phase shift transformer and to include thyristors for preventing a inrush current, a second capacitor configured to generate a second DC_link voltage by smoothing a voltage rectified by being connected to a second rectification unit, and a second inverter unit configured to generate a PWM voltage by switching in response to control of the second SMPS and to be connected to the first inverter unit.

Preferably, but not necessarily, the first inverter unit may include first and second inverter groups each formed with a plurality of unit inverters, and the second inverter unit includes third and fourth inverter groups each formed with a plurality of unit inverters.

Preferably, but not necessarily, the first inverter group may be connected to the third inverter group at a first contact point and the second inverter group may be connected to the fourth inverter group at a second contact point.

Preferably, but not necessarily, a signal at the first contact point and a signal at the second contact point may be outputted as PWM signals of the power cells.

Preferably, but not necessarily, one single controller may be formed to control both the first and second SMPSs.

Preferably, but not necessarily, the two controllers may be formed, where one controller controls the first SMPS and the other controller controls the second SMPS.

Advantageous Effects

The inverter with power cell of dual structure according to exemplary embodiments of the present disclosure can be advantageously applied to formation of a power cell that operates by receiving a high voltage of 1270V, when one power cell of dual structure formed with two power cells that conventionally receive low voltage of 635V is formed, and a voltage at a contact point, where inverter units of power cell of dual structure are mutually connected, is outputted as a PWM voltage. Thus, an SMPS for conventionally controlling a power cell that receives a voltage of 635V as an input can be used as is, whereby additional development cost and manufacturing cost for separate SMPS development for power cell that operates by receiving a high voltage of 1270V can be reduced.

Furthermore, use of controllers can be reduced when one controller is used to control two SMPSs, whereby manufacturing cost and inverter volume can be reduced.

BRIEF DESCRIPTION OF THE DRAWINGS

FIG. 3 is a schematic view illustrating relationship between SMPS and two controllers in an inverter with power cell of dual structure according to an exemplary embodiment of the present disclosure.

DETAILED DESCRIPTION

Figure 1:
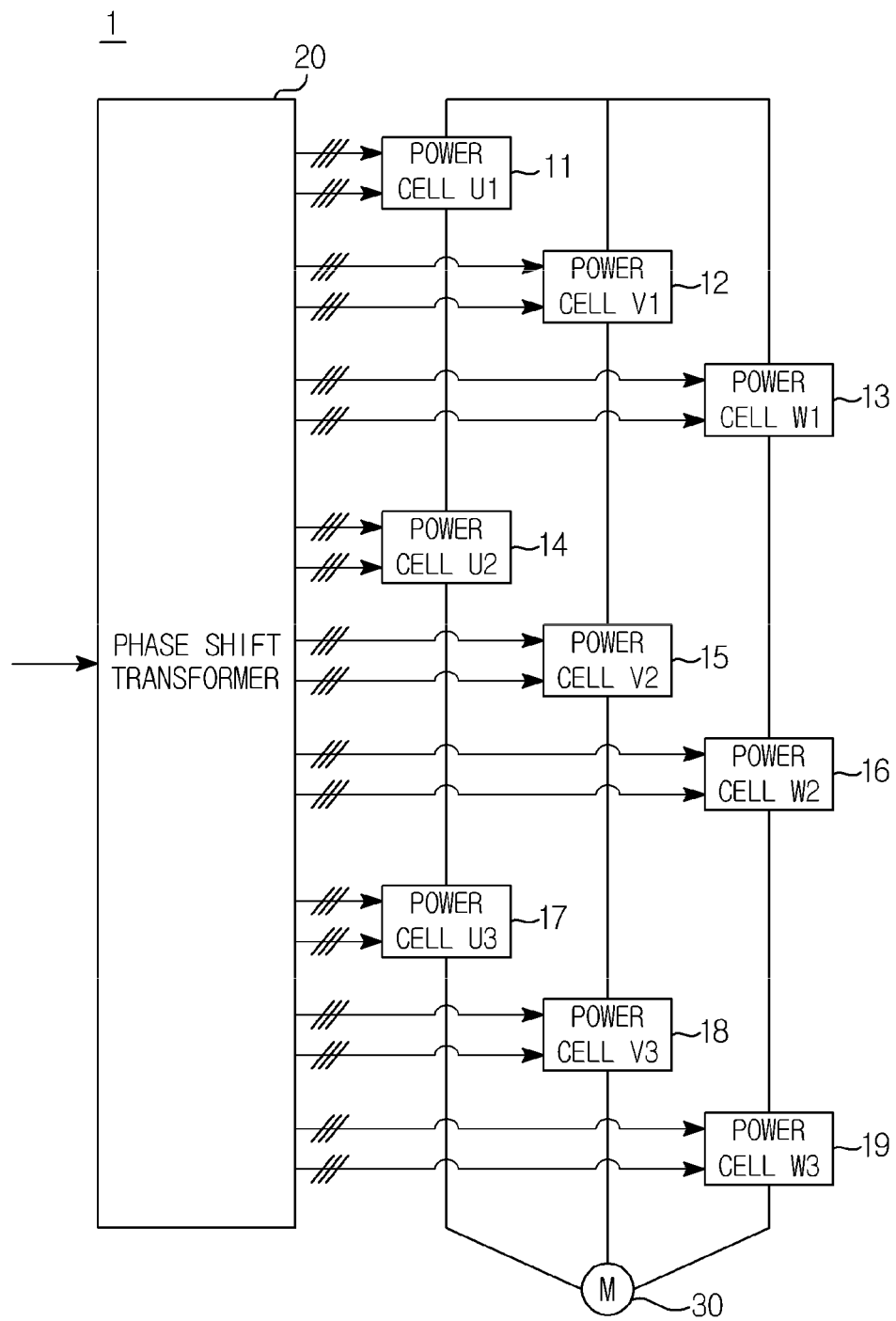
FIG. 1 is a structural view illustrating an inverter with power cell of dual structure according to an exemplary embodiment of the present disclosure.

Now, the exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Particular terms may be defined to describe the invention in the best mode as known by the inventors. Accordingly, in the drawings, the size and relative sizes of layers, regions and/or other elements may be exaggerated or reduced for clarity. Like numbers refer to like elements throughout and explanations that duplicate one another will be omitted. The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 2:
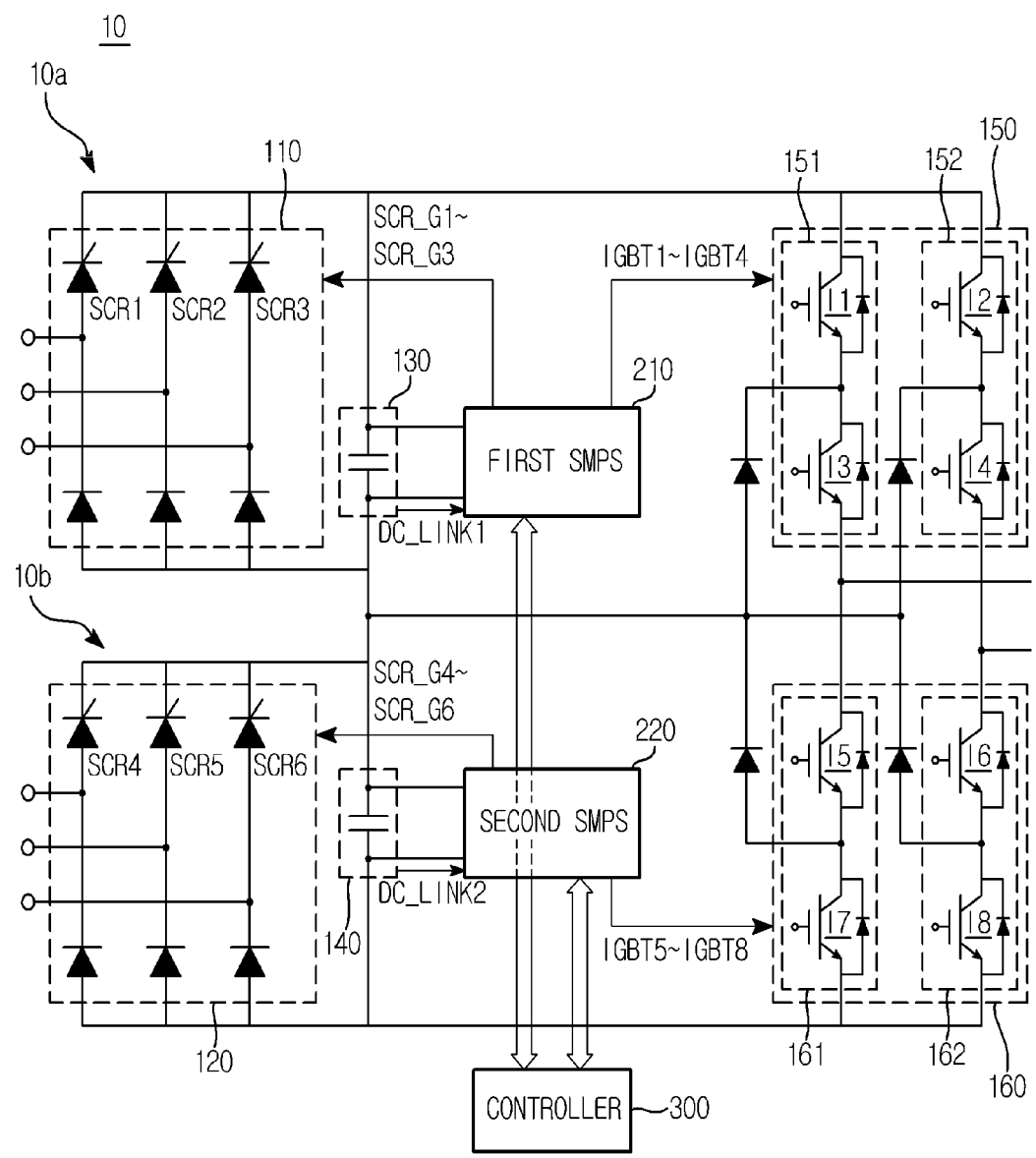
FIG. 2 is a schematic view illustrating relationship between SMPS and controller in an inverter with power cell of dual structure according to an exemplary embodiment of the present disclosure.

FIG. 1 is a structural view illustrating an inverter with power cell of dual structure according to an exemplary embodiment of the present disclosure, and FIG. 2 is a schematic view illustrating relationship between SMPS and controller in an inverter with power cell of dual structure according to an exemplary embodiment of the present disclosure.

Referring to FIGS. 1 and 2, an inverter with power cell of dual structure is configured such that each phase is formed by serially connecting a plurality of power cells formed with a plurality of stages operated by being connected to a phase shift transformer (20) that supplies independent power and receiving a power supplied from the phase shift transformer (20), where each phase supplies a power to a multi-phased motor (30).

At this time, the plurality of power cells may be arranged in a 3-tier, 9-power cell (11~19), and each of the power cells (11~19), as confirmed from the power cell (10) structure in FIG. 2, has a dual structure formed with first and second power cell regions (10a, 10b). In addition, an inverter (1) with power cell of dual structure may include a first SMPS (210) connected to a first power cell region (10a), a second SMPS (220) connected to a second power cell region and a controller (300) configured to control the first and second SMPSs (210, 220).

At this time, the first power cell region (10a) may include a first rectification unit (110), a first capacitor (130), and a first inverter unit (150), and the second power cell region (10b) may include a second rectification unit (120), a second capacitor (140) and a second inverter unit (160), where the configuration of the first power cell region (10a) and the configuration of the second power cell region (10b) may be independently operated.

The first rectification unit (110) receives an independent power from the phase shift transformer (20) to rectify a 3-phase AC power, and includes a diode and thyristors (SCR1~SCR3) for prevention of inrush voltage. The first capacitor (130) is connected to the first rectification unit (110) to smooth the voltage rectified by the first rectification unit (110), and the second capacitor (140) is connected to the second rectification unit (120) to smooth the voltage rectified by the second rectification unit (120), whereby a first DC_link voltage and a second DC_link voltage are respectively generated. At this time, the first capacitor (130) and the second capacitor (140) are serially connected.

The first SMPS (210) generates thyristor gate signals (SCR_G1~SCR_G3) for removing driving of thyristors (SCR1~SCR3) of the first rectification unit (110) using the first DC link (DC_Link1) voltage generated by the first capacitor (130) as a power source, and also generates inverter gate signals (IGBT1~IGBT4) for controlling operation of unit inverters (I1~I4) of the first inverter unit (150).

Furthermore, the first SMPS (120) detects the first DC link (DC_Link1) voltage and transmits the first DC link (DC_Link1) voltage to the controller (300), and generates inverter gate signals (IGBT1~IGBT4) of unit inverters (I1~I4) by receiving a PWM signal from the controller (300).

Meantime, the second SMPS (220) generates thyristor gate signals (SCR_G1~SCR_G3) for removing driving of thyristors (SCR4~SCR6) of the second rectification unit (120) using the second DC link (DC_Link2) voltage generated by the second capacitor (140) as a power source, and also generates inverter gate signals (IGBT5~IGBT8) for controlling operation of unit inverters (I5~I8) of the second inverter unit (160). Furthermore, the second SMPS (220) detects the second DC link (DC_Link2) voltage and transmits the second DC link (DC_Link2) voltage to the controller (300), and generates inverter gate signals (IGBT5~IGBT8) of unit inverters (I5~I8) by receiving a PWM signal from the controller (300).

The first inverter unit (150) includes a plurality of unit inverters (I1~I4) and generates a PWM voltage by being switched by receiving the inverter gate signals (IGBT1~IGBT4) of the first SMPS (210). At this time, the first inverter unit (150) may include serially connected a first inverter group (151) and a second inverter group (152), where the first inverter group (151) may include a serially-connected plurality of unit inverters (I2, I4). The second inverter unit (160) includes a plurality of unit inverters (I5~I8) and generates a PWM voltage by being switched by receiving the inverter gate signals (IGBT5~IGBT8) of the second SMPS (220).

At this time, the second inverter unit (160) may include parallel connected a third inverter group (161) and a fourth inverter group (162), where the third inverter group (161) may include a serially-connected plurality of unit inverters (I5, I7), and the fourth inverter group (162) may include a serially-connected plurality of unit inverters (I6, I8). Meantime, the first and second inverter units (150, 160) are serially connected, and a signal at a contact point connected by the first and second inverters (150, 160) is outputted as PWM voltage.

That is, the first inverter group (151) of the first inverter unit (150) and the third inverter group (161) of the second inverter unit (160) are mutually contacted at a first contact point (S1), and the second inverter group (152) of the first inverter unit (150) and the fourth inverter group (162) of the second inverter unit (160) are mutually contacted at a second contact point (S2).

At this time, a signal at the first contact point (S1) and the second contact point (S2) are outputted as PWM voltages of the power cell (10). The controller (300) outputs the PWM signals to the first and second SMPS (210, 220), where the first and second SMPS (210, 220) generate the inverter gate signals (IGBT1~IGBT8) in response to the PWM signal.

Meantime, although the exemplary embodiment of the present disclosure has described a configuration where one single controller (300) is included to control both the first and second SMPSs (210, 220), the present disclosure is not limited thereto, and two controllers (300, 400) as shown in FIG. 3 may be included to control the first and second SMPSs (210, 220) respectively.

According to the present disclosure thus configured, when a single power cell of dual structure formed with two power cells that use the conventional 635V as an input is formed, and a voltage at a contact point mutually connected by the inverter unit of dual structured power cell is outputted as a PWM voltage, a power cell that operates by receiving 1270V can be made.

Furthermore, according to the configuration thus described, an SMPS for controlling a power cell receiving the conventional voltage of 535V as an input can be used as it is, such that an additional development cost for development of separate SMPS for power cell that operates by receiving a high voltage like 1270V and manufacturing cost can be reduced.

In addition, when one controller is employed to control two SMPSs, the use of controller can be reduced to reduce the manufacturing cost and volume of inverter.

Although the present disclosure has been described with reference to a number of illustrative embodiments for an inverter with power cell of dual structure, it should be understood that other numerous modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. An inverter with power cell of dual structure, the inverter comprising:
    a first SMPS (Switching Mode Power Supply) connected to a first power cell region;
    a second SMPS connected to a second power cell region; and
    a controller connecting the first and second SMPSs;
    wherein:
    each phase of the inverter is formed by serially connecting a plurality of power cells formed with a plurality of stages operated by receiving power supplied from a phase shift transformer; and
    each of the plurality of power cells is mutually connected and comprises the first power cell region and the second power cell region configured to independently operate;
    wherein the first power cell region comprises:
    a first rectification unit comprising thyristors for preventing an inrush current and configured to perform rectification by receiving power from the phase shift transformer;
    a first capacitor connected to the first rectification unit and configured to generate a first DC link voltage by smoothing a voltage rectified by the first rectification unit; and
    a first inverter unit configured to generate a PWM voltage by switching in response to control by the first SMPS;
    wherein the second power cell region comprises:
    a second rectification unit comprising thyristors for preventing an inrush current and configured to perform rectification by receiving power from the phase shift transformer;
    a second capacitor connected to a second rectification unit and configured to generate a second DC link voltage by smoothing a voltage rectified by the second rectification unit; and
    a second inverter unit connected to the first inverter unit and configured to generate a PWM voltage by switching in response to control by the second SMPS; and
    wherein:
    the first inverter unit includes first and second inverter groups each formed with a plurality of unit inverters;
    the second inverter unit includes third and fourth inverter groups each formed with a plurality of unit inverters; and
    the first inverter group is connected to the third inverter group at a first contact point and the second inverter group is connected to the fourth inverter group at a second contact point.

2. The inverter of claim 1, wherein a signal at the first contact point and a signal at the second contact point are output as PWM signals of the plurality of power cells.

3. The inverter of claim 1, wherein the controller is a single controller configured to control both the first and second SMPSs.

4. The inverter of claim 1, wherein:
    the controller comprises two controllers; and
    one of the two controllers controls the first SMPS and the other of the two controllers controls the second SMPS.

* * * * *